March 25, 1969   A. L. KING   3,434,231
FISHING TOOL
Filed Sept. 30, 1966
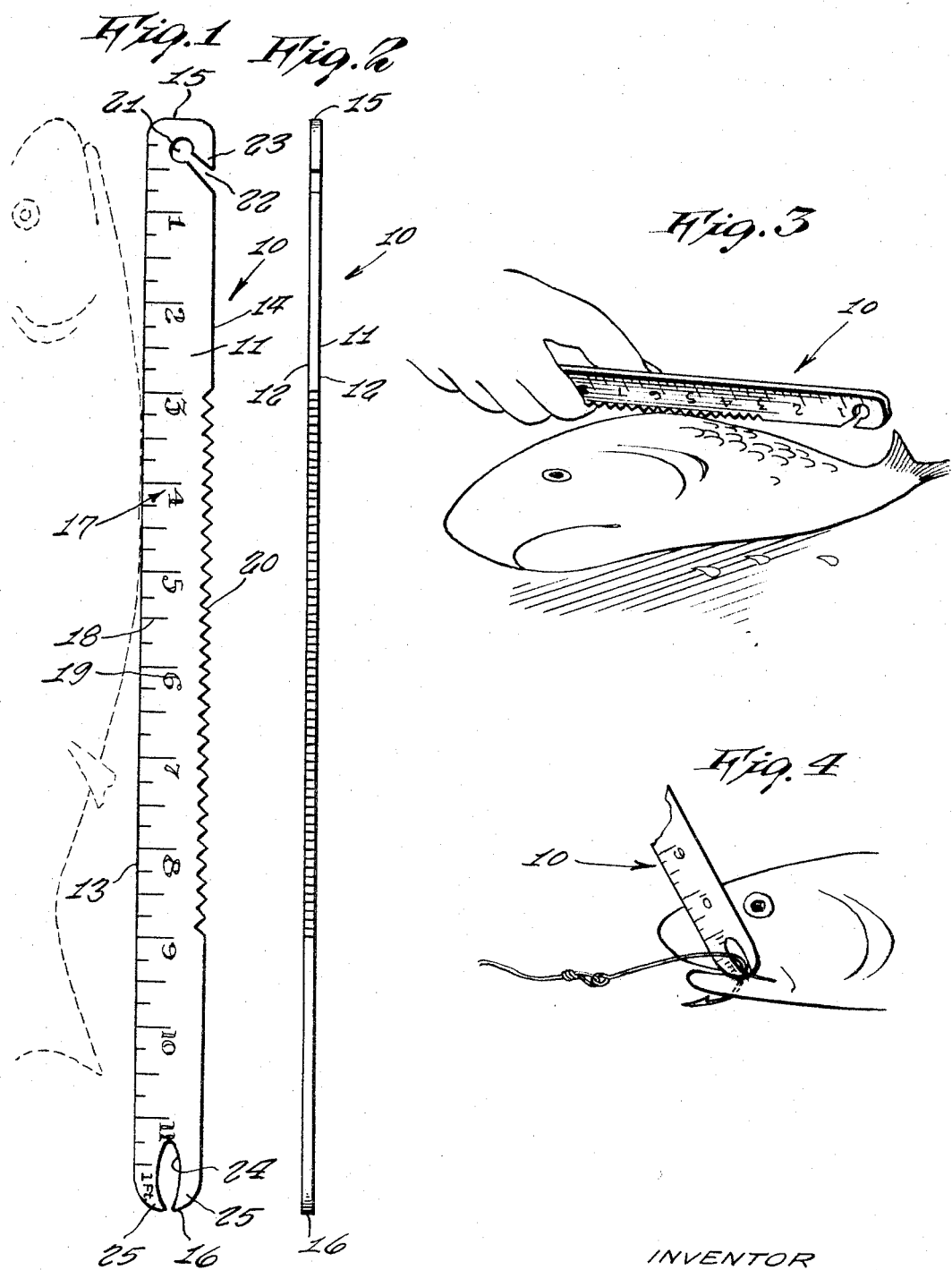
INVENTOR
ARLIE L KING United States Patent Office 3,434,231
Patented Mar. 25, 1969

3,434,231
FISHING TOOL
Arlie L. King, Box 46, Bowerston, Ohio 44695
Filed Sept. 30, 1966, Ser. No. 583,403
Int. Cl. A01k 97/00; A22c 25/10, 25/02
U.S. Cl. 43—53.5                                    1 Claim

ABSTRACT OF THE DISCLOSURE

A multipurpose fisherman's tool which includes a scale for measuring a fish, a fish scale remover, a plug and fly remover, and a fishhook removing device, all of the devices being contained upon a single base.

---

This invention relates generally to sport fishermen's accessories. More specifically it relates to a combination tool used by sports fishermen in attending a fish that is caught.

A principal object of the present invention is to provide a fishing tool for use by sports fishermen and which performs several various duties such as measuring the length of a fish, removing the scales from the fish, removing a hook from a caught fish, removing a plug and fly and various other useful needs.

Another object of the present invention is to provide a fishing tool having the above uses and which comprises a single part which may be conveniently fitted among the fisherman's gear.

Another object of the present invention is to provide a fishing tool which can be made from a length of flat metal stock which can be conveniently stamped.

Other objects of the present invention are to provide a fishing tool which is simple in design, inexpensive to manufacture, rugged in construction, easy to use and efficient in operation.

These and other objects will be readily evident upon a study of the following specification and the accompanying drawing wherein:

FIGURE 1 is a side elevation view of the present invention shown in operative use measuring a fish;

FIGURE 2 is a side elevation view thereof;

FIGURE 3 is a perspective view thereof shown in operative use scaling a fish;

FIGURE 4 is a fragmentary side elevation view of the present invention shown in operative use removing a hook from a fish.

Referring now to the drawing in detail the numeral 10 represents a fishing tool according to the present invention wherein there is a one-piece member 11 made preferably from a flat stock of metal such as stainless steel or the like so that the same may not readily rust and which includes flat opposite sides 12 bounded by parallel opposite longitudinal edges 13 and 14 and by ends 15 and 16.

Upon one or both sides 12 of the member 11 a 12 inch scale 17 may be imprinted or engraved as shown in FIGURE 1 of the drawing and which includes graduation marks 18 and numerical digits of inches 19. While the edge 13 is relatively straight due to its association with the scale 17, the opposite edge 14 is serrated at its midportion with a plurality of adjacent teeth 20 for the purpose of using the device in scaling a fish as shown in FIGURE 3 of the drawing.

Adjacent the end 15 of the member 11 there is a circular opening 21 and a diagonal slot 22 which communicates with the opening 21 and the edge 14 of the member 11. The diagonal slot forms a hook 23 adjacent thereto which is used for plug and fly removing.

The opposite end of the member 11 is provided with a longitudinally extending elliptical opening 24 which thus accordingly bifurcates the end 16 to form hooked prongs 25, the purpose of which is for removing of a hook from a fish's mouth as is shown in FIGURE 4 of the drawing.

In operative use the device may be used for measuring a fish as is shown in FIGURE 1 of the drawing, for scaling fish as is shown in FIGURE 3, or removing a fishhook as is shown in FIGURE 4 or for plug and fly removing and for various other purposes which a fisherman may find.

While various changes may be made in the detailed construction it is understood that such changes will be within the spirit and scope of the present invention.

I claim:
1. In a fishing tool, the combination of a one-piece member, said one-piece member being of elongated configuration and having flat opposite sides, said sides being bounded by opposite side edges which are parallel to each other and opposite ends, said member having self-contained means for measuring a length of fish, means for scaling a fish, means for removing a fishhook, and means for plug and fly removal, said means for measuring a fish comprising a scale imprinted or engraved upon at least one of said sides of said member, said scale comprising a plurality of graduations and a plurality of numerical figures representing inches for measuring said fish, said means for scaling a fish comprising one of said edges having a central portion thereof serrated to form a plurality of adjacent teeth, said teeth engaging the edges of fish scales during a scaling operation, said means for removing a fishhook comprising one of said ends of said member being bifurcated by means of a longitudinally extending, elliptical opening, said bifurcated end forming a pair of inwardly pointed hooked tongs directed toward each other for engaging a hook in a fish's mouth, and said means for plug and fly removal comprising a circular opening through said member near an opposite end thereof and a diagonally extending slot communicating with said opening and one of said longitudinal edges to form an acute configurated hook, said hook being used for plug and fly removal.

References Cited

UNITED STATES PATENTS

| D. 200,582 | 3/1965 | Klompus et al. | D31—4 |
| 1,788,656 | 1/1931 | Brown | 43—53.5 X |
| 2,244,270 | 6/1941 | Verrett | 43—53.5 |
| 2,932,117 | 4/1960 | Wear | 43—53.5 |
| 3,115,722 | 12/1963 | Mann | 43—53.5 X |

FOREIGN PATENTS

| 873,063 | 7/1961 | Great Britain. |

WARNER H. CAMP, *Primary Examiner.*

U.S. Cl. X.R.

17—7